United States Patent

Mowat et al.

[15] 3,640,542
[45] Feb. 8, 1972

[54] OIL SEAL WITH PUMPING ACTION

[72] Inventors: Keith B. Mowat, 186 Taylor Road, Ancaster, Ontario, Canada; William O. Heyn, 256 Woodbine Place, Barrington, Ill. 60010

[73] Assignee: Chicago Rawhide Manufacturing Co. Chicago, Ill.

[22] Filed: Feb. 18, 1970

[21] Appl. No.: 12,234

[52] U.S. Cl. ................................................277/134
[51] Int. Cl. ...................................F16j 15/32, F16j 15/48
[58] Field of Search ......................................277/134, 153

[56] References Cited

UNITED STATES PATENTS

| | | | |
|---|---|---|---|
| 3,504,920 | 4/1970 | Halliday | 277/13 X |
| 3,515,395 | 6/1970 | Weinand | 277/13 X |
| 2,958,551 | 11/1960 | Rogers | 277/134 X |

FOREIGN PATENTS OR APPLICATIONS

| | | | |
|---|---|---|---|
| 499,480 | 1/1939 | Great Britain | 277/134 |

Primary Examiner—Samuel B. Rothberg
Attorney—Greist, Lockwood, Greenawalt & Dewey

[57] ABSTRACT

An oil seal for rotating shafts and the like having a portion adapted to be received within an opening in a machine element, and an inwardly facing flexible primary lip having portions thereof adapted to engage a part of the periphery of a shaft passing therethrough in oiltight relation. The inner surface of the primary lip resiliently but snugly engages the outer surface of an associated shaft to form a given contact area, with this portion of the lip cooperating with at least portions of one or more sinuous ribs lying on the inner surface of the primary lip, to effect a pumping action on oil trapped therebetween upon rotation of the shaft. One sinuous rib preferably has portions thereof tangent to the contact area, with the other portions of the sinuous rib being more or less closely spaced axially apart from the contact area to define therebetween a space of continuously varying axial dimension. In one embodiment, the primary lip is given its final dimension in molding, thereby predetermining the portion thereof which will form the contact area on the shaft, and in other embodiments, the final dimensioning of the primary lip occurs after molding, since the seal is trimmed to its final dimension by a subsequent operation. In the latter case, the sinuous rib may either intersect or be tangent to the contact area. The amplitude and frequency of the sinuous rib depend principally on the intended application and the material in question. In the preferred form, rib thicknesses vary as the ribs more or less closely approach the portion of the primary lip which contacts the seal.

11 Claims, 12 Drawing Figures

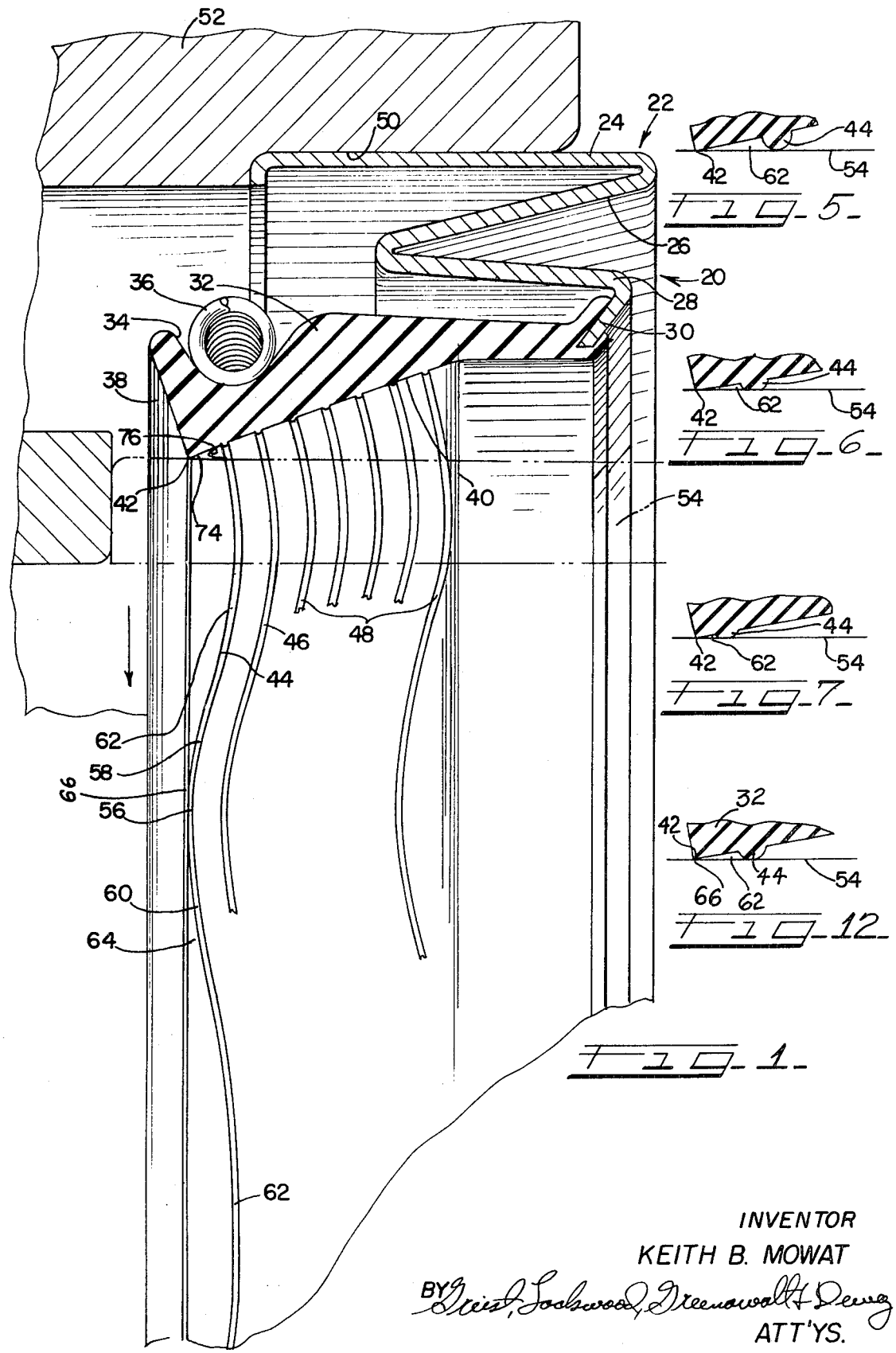

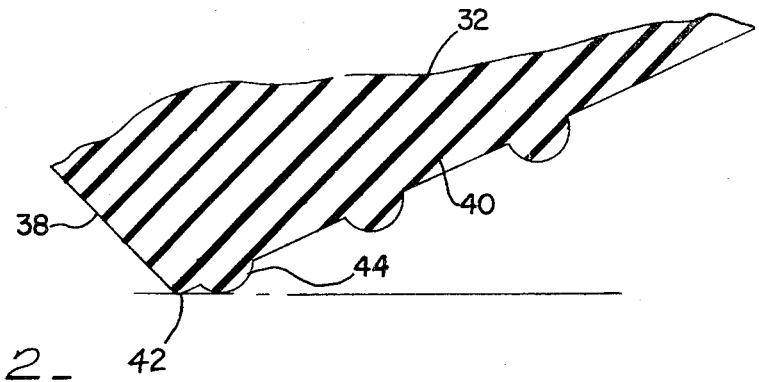
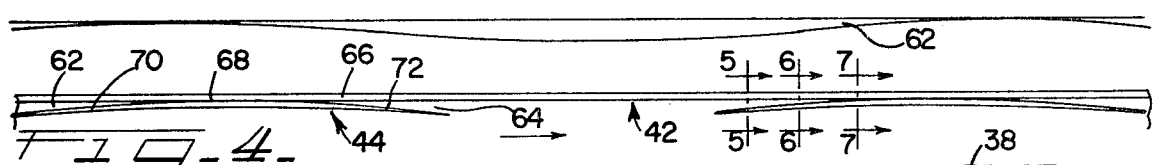
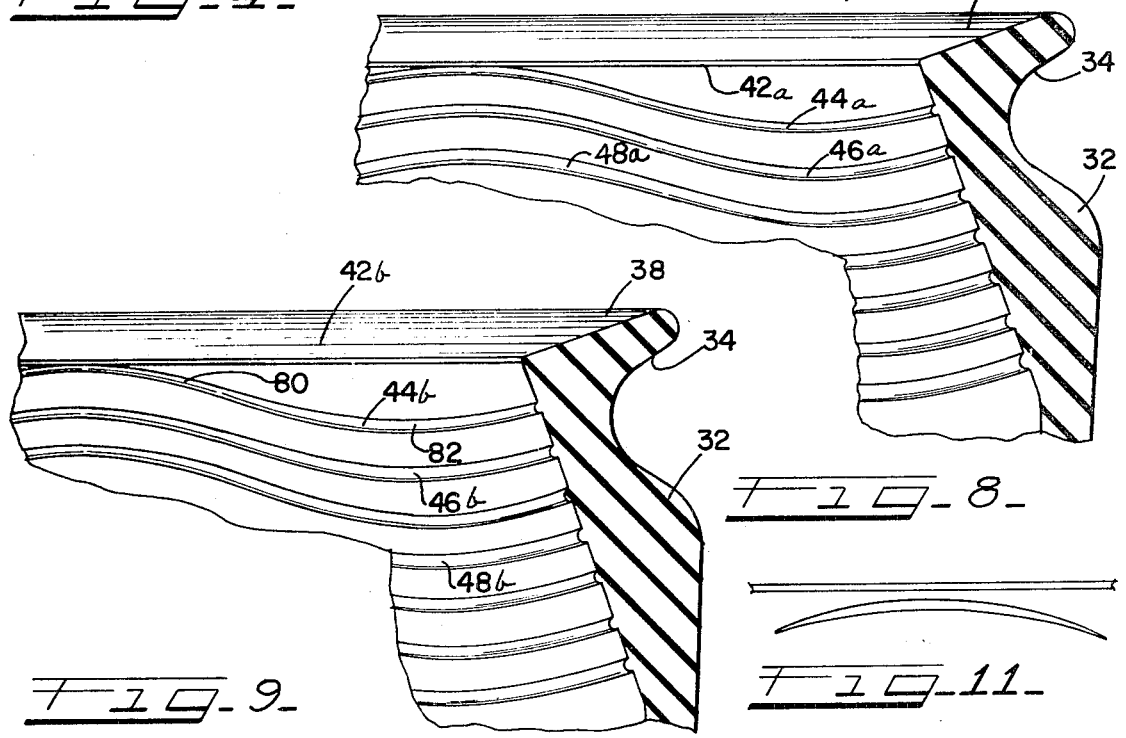
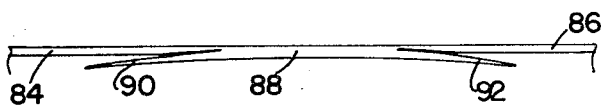

OIL SEAL WITH PUMPING ACTION

BACKGROUND OF THE INVENTION

The present invention relates generally to shaft seals for retaining lubricants within machine housings, such as engine crankcases, wheel bearing and axle housings, railroad axle journal boxes and the like. More particularly, the invention is directed to shaft seals of a type having a so-called pumping action, that is, seals which are constructed so that by reason of their construction and by reason of the tendency of the oil or the like wetting both the shaft and the sealing element to be drawn along with the shaft during rotation, tend to force or pump a certain rotations, of such oil under the area of the lip in contact with the shaft and back into the interior of the region to be sealed in a manner to be further detailed herein.

In the past, a number of different designs for seals having this purpose have been developed, but most if not all of these seals have been characterized by one or more drawbacks.

In oil seals of the type under consideration, a number of requirements are present. One requirement is that the seal have a configuration such that rotation of the shaft relative to the seal will cause the oil wetting the shaft surface to be carried along and forced in a desired direction by the provision of a contact area on the primary lip for cooperation with contact areas formed by one or more ribs on the lip which contact the shaft to define between these areas a zone of decreasing cross-sectional extent for creating a pumping action under conditions of shaft rotation.

Another requirement is that such a seal should be capable of providing a fully effective static seal, that is, effective sealing action must be present when the shaft is not in motion. In other words, full sealing action must be provided by the seal under static conditions, in addition to whatever hydrodynamic sealing action results from the ability of the seal to pump oil wetting a rotating shaft into the region from which it may have escaped. Thus, for example, the seal may be called upon to seal a wheel bearing and axle assembly wherein the normal lubricant level lies above some part of the shaft to be sealed. These lubricants must be retained in place whether or not the auto is moving. Even in an automobile having a normal lubricant level lying somewhat below the bottoms of any bearing or the like to be sealed, a static seal is often required, since such an auto may commonly be parked on steep hills or the like, or may be overfilled with lubricant causing potential static leakage.

Such a static seal is also, by way of example, very important for the journal boxes of railroad cars of the type wherein the axles are supported on tapered roller bearings running in an oil bath, since it is common for railroad cars not only to be operated continuously for long periods, but also to be allowed to stand idle for days or even weeks at a time.

Another desirable feature for a satisfactory shaft seal having good static seal characteristics and pumping action is that it be birotational, that is, it should provide substantially equally effective pumping action in both relative directions of shaft rotation. This is important, not only to allow those stocking such seals for sale to maintain a reduced inventory level, but to reduce the chances of an installer mistakenly installing a "right-hand" seal on a "left-hand" shaft.

This might occur in the case of seals being used for sealing miscellaneous machine shafts, particularly where the purchaser may not know in advance, or may not recall when purchasing a seal, which direction of relative rotation will be undergone by the shaft. The need for birotational pumping feature is also apparent when it is considered that automotive vehicles are frequently driven backwards for greater or less distances, and that railroad cars are designed for satisfactory operation in both directions, and commonly travel substantially as far with a given end thereof toward the front of a train of which the car forms a part as with such end to the rear of such train. It will be understood that "birotational" as used herein refers to the ability of the seal to pump oil in one axial direction relative to a shaft regardless of the direction in which the shaft rotates, as distinguished from the ability of a double-ended seal to pump oil in two axial directions while the shaft rotates in a single direction. Seals of this double-ended type, which are commonly used to keep different lubricants from mixing with each other by reason of undesired movement along a common shaft, are not of the type with which this invention is concerned per se.

In the past, seals having good pumping action have been available, but these seals have commonly had poor static sealing characteristics. Other seals with good pumping action have been effective either only or primarily in one direction of shaft rotation. Still other seals have had good static seal characteristics but poor pumping action, while still other seals have had one or more advantages, but have attained them only by reason of strong radial preloading forces which have greatly shortened the useful life of the seals.

Having the foregoing requirements in mind, and considering that prior art seals made for the above set forth purposes have been either satisfactory or have been capable of further improvement, an object of the present invention is to provide a shaft seal for lubricants and the like characterized by excellent static seal characteristics, good pumping effectiveness, and birotational pumping action.

Another object of the invention is to provide an oil seal assembly capable of providing good pumping action and being of low cost and relatively simple construction.

Another object is the provision of such a seal which is readily adapted to be manufactured by both the so-called trimmed lip method and the so-called molded lip method.

Another object is to provide a seal in which effective pumping action will continue in use of the seal even though the seal has been subjected to significant wear.

A still further object is the provision of a seal in which a good static seal may be provided with minimum radial force, while still providing good pumping action, so as to minimize wear caused by excessive seal-to-shaft friction.

A further object is the provision of a seal having, in one form, a contact area formed from a portion of the primary lip and a plurality of sinuously extending ribs having the axis of propagation thereof lying generally parallel to the plane of the contact area between the shaft and the shaft contacting area of the primary lip.

Another object is to provide a seal unit in which the ribs are arranged to continue to provide a pumping action even after the primary lip has undergone significant wear and/or dimensional variation as a result of use.

Another object is the provision of a seal unit in which at least two oppositely directed oil-trapping areas are provided, each having portions of reduced cross-sectional area near the ends thereof, with these ends being oppositely disposed so that, regardless of the direction of shaft rotation, positive pumping action will take place.

Another object is to provide an oil seal in which the ribs serve to provide the pumping action are of a sinuous configuration, having an axis of propagation lying in a plane parallel to the plane occupied by the contact area formed between a portion of a primary lip and the shaft to be sealed, and in which at least one rib has portions thereof tangent to or intersecting such contact area.

The present invention achieves these objects, and others which are inherent in the invention by providing an oil seal having a mounting portion and a flexible primary lip portion, with the primary lip including a shaft contacting portion defining a contact area extending around an inner surface of the lip for engaging the outer surface of a shaft passing therethrough in fluidtight sealing engagement, and one or more sinuous rib portions extending about the inside of the lip and having at least portions thereof which alternately approach and depart axially from the contact area throughout their extent about the inner circumference of the seal, to define, in cooperation with said area, fluid trapping regions of gradually decreasing cross-sectional area in either relative direction of shaft rotation. The exact manner in which these objects, and other inherent objects and advantages of the invention are achieved will become more clearly apparent when reference is made to the following detailed description of the preferred embodiments of the invention shown in the accompanying drawings in which like reference numerals indicate corresponding parts throughout.

BRIEF DESCRIPTION OF THE DRAWINGS

FIG. 1 is a greatly enlarged vertical sectional view, with portions broken away, showing one form of oil seal of the invention in association with a shaft to be sealed shown in phantom lines;

FIG. 2 is a fragmentary view, on a further enlarged scale, showing the configuration of a portion of the primary lip of the seal of the invention;

FIG. 3 is a partly diagrammatic projected view of the pattern formed by contact between the shaft and portions of the primary lip;

FIG. 4 is a projected view of the contact pattern made on the shaft to be sealed by the primary lip and one of the ribs, in normal use of the seal;

FIGS. 5–7 are further enlarged vertical sectional views taken along lines 5—5, 6—6 and 7—7 of FIG. 4;

FIG. 8 is a fragmentary view of a portion of the primary lip of a modified form of the invention;

FIG. 9 is a fragmentary view of a portion of the primary lip of the type shown in FIG. 1, with parts thereof shown on an exaggerated scale for purposes of clarity;

FIG. 10 is a projected view of the contact pattern made on the shaft to be sealed by the shaft contacting portion of the primary lip and one of the ribs forming a part of the primary lip, in a modified form of seal unit of the invention;

FIG. 11 is a projected view of the contact pattern formed by portions of the primary lip engaging the shaft to be sealed; and FIG. 12 is a fragmentary vertical sectional view showing a portion of the primary lip of the invention and the position of one of the ribs thereon.

DESCRIPTION OF THE PREFERRED EMBODIMENTS OF THE INVENTION

Although it will be apparent that the invention is useful in a number of different forms, the invention will be illustrated by reference to an oil seal unit of the type used to seal a wheel bearing and axle assembly against oil leakage.

Referring now to the drawings in greater detail, there is shown in FIG. 1 an oil seal assembly 20 comprising mounting means in the form of a casing 22 having an outer, generally axially extending flange 24, an offsetting flange 26, and a primary lip-mounting portion 28, including a generally radially inwardly directed flange 30 to which a rubber or like flexible primary lip 32 is bonded. The primary lip 32 is defined in part by a spring-receiving groove 34, for accommodating a conventional-type garter spring 36, and in part by an axially inner, partially radially inwardly directed inside lip surface portion 38 and a second, generally radially inwardly directed outside lip surface portion 40. The outside lip surface 40 joins the inside lip surface 38 along a line 42 to form an intended line or area of shaft contact. The primary lip 32 also includes a plurality of generally sinuously extending ribs 44, 46, 48, all of generally semicircular cross section and being integrally molded as a part of the outside lip surface 40. The entire seal 20 is carried within an opening defined by an inwardly facing portion 50 of a machine part 52 into which extends a shaft 54 to be sealed, the shaft being shown in phantom lines in FIG. 1, for example.

Referring now to the configuration of the ribs 44, 46, 48, etc., it will be noted that these ribs extend sinuously about the outside lip surface 40 of the primary lip 32 with the axis of propagation thereof lying in a plane parallel to and axially spaced apart from the plane defined by the junction line 42. In the illustrated embodiment, the rib 44 approaches the junction line 42 in its progress around the inner surface, lying tangent or nearly tangent to the line 42 at point 56, being somewhat spaced apart therefrom at points 58 and 60, and being spaced farthest apart therefrom at point 62, for example. In this connection, it will be appreciated that the line 42 formed at the junction between surfaces 38, 40, will, upon application of a radial load to the primary lip 32, spread somewhat outwardly to form a contact area 66 of the type illustrated in FIG. 4. The width of this contact area will depend upon factors such as the stiffness of the material of which the lip 32 is made and the axial loading applied to the lip 32. It will also be understood that, as the seal undergoes wear in use, the width of the contact area 66 will gradually but significantly increase.

By reference to FIGS. 1, 3 and 4, for example, it will be noted that, assuming relative shaft travel to be in the direction indicated by the arrows, a region 62 of gradually diminishing axial extent and cross section is formed near the point of contact 56 between the area 66 and the rib 44 and that a corresponding reduced axial extent and cross section region 64 is also formed between area 66 and rib 44 and lies generally opposite region 62 in the region 64. Since the undulations of rib 44 are symmetrical, this region 64 also has a gradually decreasing axial extent and cross-sectional area between the area 42 and the rib 44 assuming that the reference direction were opposite that shown by the arrows in FIGS. 1, 3 and 4.

In a typical oil seal of the type illustrated, the radius of each semicircular rib would typically be from about 0.003 to 0.006 inch, the height or depth thereof from about 0.001 inch to about 0.006 inch, the maximum amplitude of the sinusoidal figure generated by the rib 44 would be about 0.040 to 0.050 inch, and the ribs 44, 46, etc., would be spaced apart about 0.010 to 0.025 inch. The "frequency" of the sinusoidal "wave" normally bears a somewhat fixed, empirically determined relation between the shaft diameter and the wave amplitude and rib height or depth.

Referring now to FIGS. 3 and 4, a projected view or illustration of the relation between the area 66 and the rib 44 is shown. As indicated in FIG. 4, with the seal unit 20 in place over a shaft 54 to be sealed, a contact area 66 having a small but definite axial extent is seen to be formed by contact between the junction line 42 and the portion of the shaft 54 associated therewith. FIG. 4 also shows a contact area 68 of further increased width as well as a pair of oppositely disposed contact areas 70, 72. These areas 70, 72 have increasing axial widths as they approach the contact area 66, and where they join the contact area 66, they form a further enlarged common contact area 68. Fluid-trapping regions 62, 64 are defined between these contact areas 66, 70, and 66, 72 in a manner, and for reasons now to be discussed.

Referring now in particular to FIG. 1, there is shown a small area 74 lying between the outer surface of the shaft 54 and the outside lip surface 40 of the primary lip 32, just axially outwardly of the line 42. A small quantity of oil normally collects in this area and wets not only the inside lip surface 38 and the outside lip surface 40 of the primary lip 32, but also the metal shaft 54, forming a meniscus or radius of curvature 76.

As is well known in the art, there is a definite surface attraction between the oil and the shaft, as well as between the oil and the rubber, which is brought about by various factors, including the fact that wetting agents such as heavy metal soaps and the like are provided in lubricating oils and greases to cause strong adherences of the oil or grease film to the metal. As a result of this fact, it is apparent that, properly speaking, the areas 66, 68, of the primary lip 42 said to contact the shaft are actually rather in contact with a thin film of oil strongly adsorbed on the metal shaft. The adsorbed oil layer also has associated therewith a certain amount of oil carried with this layer because of cohesive forces within the oil. Thus, the oil is retained in place in the assembly to be sealed through the thin layer of oil lying between the contact surface 66 of the primary lip 32 and the shaft 54.

It will also be apparent that, by reason of the strong adsorption of the oil to the shaft surface, and by reason of the cohesion of the oil, high-speed rotation of the shaft will draw or tend to draw a certain amount of oil along with the shaft. On the areas lying along the radially inner parts of the surface 38 of the primary lip 32, in a typical embodiment of the invention, there is no pressure tending to force oil axially outwardly along the shaft 54, with the possible exception of a slight static pressure which may exist if the oil level lies above a portion of the seal-shaft interface. With the above in mind, the case may be considered where, upon shaft rotation, a plurality of layers of oil are drawn along with the shaft, such oil layers being several orders thicker than the thickness of the film in the area 66 between the primary lip 32 and the shaft 54.

Upon rotation of the shaft in the direction shown by the arrow in FIG. 1, oil will be drawn around the outside surface 40 of the primary lip 32 in the region 74. By reference to FIGS. 4–7, it will be seen that the area 62, by reason of the approach of rib 44 to area 66, gradually decreases in axial extent and cross section. Oil trapped in this area is subject to being forced forward by reason of shaft rotation, and the tendency of the oil to move forward is resisted by the force required to push or pump the oil along the shaft 54 beneath the primary lip 32 in the region of the contact areas 66, 68 formed by the lip 32 in the region of the line 42 and the rib 44, respectively. At significant speeds, this effect is substantial, and as a result, oil is pumped in both axial directions under the lip 32 in regions 66, 68. This oil is returned into the area to be sealed, whereas oil forced beneath rib 44, although directed axially oppositely, is not "lost," since it will again be picked up by the next succeeding portion of the rib 44, that is, in areas 70, 68. In other words, approximately half of the oil drawn along with the shaft and forced into, and ultimately out of, the trapping area 62 is returned to the inner portion of the assembly, and the other half remains on a relatively outer axial part of the shaft, so that about half of it tends to be returned as the next succeeding reduced area oil trapping region is encountered.

Normally, in use, an equilibrium is rapidly established, and substantially all the oil tending to escape from the sealed area is effectively returned. If a certain amount of oil does build up during nonmovement of the shaft, such oil, to the extent it is retained on the shaft in the general area 74, is returned by the pumping action just described to the inside of the region to be sealed.

It will also be appreciated that upon significant wearing of the primary lip 32, the width or axial extent of the contact area 66 will gradually enlarge until the edges of this contact area have moved significantly away from their original positions. As a result, the contact areas 68, 70, 72 lying beneath a portion of the rib 44 will approach or intersect the contact area 66 with somewhat different geometry. The degree of wear may be such that the edges of the contact area 66 would move axially outwardly to a sufficient extent that a shaft contact area will be formed beneath one or more of the additional axially spaced apart ribs 46, 48, formed on the primary lip 32. In this connection, it will be observed, by reference to FIGS. 2 and 9, for example, FIG. 9 being somewhat exaggerated for purposes of clarity, that the height of rib 44 is greater in the area 82 thereof where it is axially spaced farthest apart from line 42 than in the region 80 thereof where it is tangent to or most closely approaches line 42 or area 66. In other words, the height or depth of the rib 44 varies throughout its extent, being smallest where it approaches line 42 or area 66 and greatest where it is farthest spaced apart therefrom.

The same condition is present in respect to ribs 46 and 48. Consequently, when the wear of primary lip 32 occurs in the manner set forth, and the locations of the fluid-trapping areas 62, 64 are altered, new fluid trapping regions may be created between the expanded contact area 66 and portions of the rib 46, for example. In addition, there will be contact between portions of the rib 44 and the shaft 52 on portions of the rib 44 which did not contact the shaft 52 when the seal was new or relatively slightly worn.

FIG. 8 shows a construction in which ribs 44a, 46a, are of differing height or depth with respect to each other. Thus, in a construction according to FIG. 8, rib 44a is of reduced height in relation to rib 46a, and rib 46a is of reduced height in relation to rib 48a. It is also within the scope of the invention to have the individual ribs 44a, 46a, 48a which are of varying overall height with respect to one another also be of varying height throughout their respective extents in the same or similar manner in which this feature exists in the embodiment shown in FIGS. 2 and 9. In FIG. 1, neither of these features is intentionally shown on an exaggerated scale, since the invention also operates satisfactorily when the ribs are of varying height with respect to one another, and when the height of each individual rib varies throughout its extent.

Typically, the height or depth of the rib ranges from about 0.001 inch to about 0.006 inch. If the ribs are partially circular in cross section, the radius thereof may be from about 0.003 inch to about 0.006 inch. Typically, the ribs 44, 46, etc., may be of constant radius but differing height as shown in FIG. 2, for example.

Referring now to FIG. 10, another contact pattern is shown, which is characterized by a pair of contact regions 84, 86 separated from each other by a central contact region 88 of somewhat increased circumferential extent. A pair of symmetrically arranged lip contact portions 90, 92 are shown joining portions 84, 86, respectively. The contact pattern shown in FIG. 10 is very similar to that of FIG. 4, except that it may be said that the lips forming the contact areas 90, 92 appear intersect the contact areas 84, 86 rather than merely approaching or becoming tangent to them. FIG. 10 thus illustrates a contact pattern which might typically occur in the case of a seal formed by the so-called trimmed lip method, to which reference is made herein. On the other hand, referring to FIG. 2, for example, it is shown that in this form of the invention, the rib 44 is formed in a definite location just axially outwardly of the line 42 formed where surfaces 38 and 40 intersect. Such a construction typically occurs in seals made by the so-called molded lip method, wherein the location of the line 42 and hence contact area 66 is determined in advance because it is fully formed in a mold, and is therefore of a predetermined form. However, in the oil seal art, it is also common to form seals by the so-called trimmed lip method, that is, a method in which the surface corresponding to the inside surface 38 of lip 32 is formed by cutting or trimming the previously molded lip 32 to a finished form or dimension after molding thereof. In such a case, line 42 is formed wherever surface 38 meets surface 40, and the location of this line is not always precisely determined or determinable in advance. In applying the present invention to seals made by the trimmed lip method, it has been found, quite unexpectedly that, it is not necessary to have the line 42 and hence contact area 66 in an exactly predetermined location, and that if line 42 is formed in a location so that it intersects or relatively more steeply approaches portions of the previously molded ribs such as ribs 44, 46, the seal will nonetheless still be very effective. In other words, if trimming the seal results in a location of the contact area 66 in a position such that a node of the rib is just tangent thereto, the seal will perform excellently, but excellent performance will still be provided with the sinusoidal ribs of the invention even where the ribs do not lie in this relation to the line 42 or contact area 66 formed by the trimming operation. Accordingly, the present invention is useful with seals made by both the molded lip and trimmed lip methods.

It is also been found that, when making seals according to the present invention by either the molded lip method or the trimmed lip method, it is not necessary that a rib 44 actually be tangent to the line 42 or contact area 66. Thus, FIG. 11 illustrates the construction of a primary lip 32 wherein a rib 44 approaches line 42 beneath which is a contact area 66, to define an area 62 of reduced cross-sectional area therebetween in relation to the cross-sectional area between rib 44 and area 66 at a different portion of the rib 44. In other words, in this construction, the rib 44 only approaches and departs from area 66, but does not become tangent thereto or intersect a portion of this area. Such a construction also has proved advantageous, and operates with seals made by the trimmed lip method and those made by the molded lip method.

As pointed out above, the empirically determined relation between the amplitude of the sinusoidal wave, shaft diameter, and number of complete wave cycles may vary somewhat among different types and sizes of shafts. However, in sealing shafts of moderate diameter, it has been found a good practice to utilize a formula in which the number of wave cycles is about equal to the product of the shaft diameter in inches times a factor of about 0.06, divided by the amplitude of the wave in inches. Thus, for example, a 3-inch-diameter shaft having a wave amplitude of about 0.045 inch would call for four complete sinusoidal cycles (4=3×0.06/0.045) on the inside of the flexible seal element. This formula has proved useful for construction in which the height or depth of the ribs was from about 0.001 inch to about 0.005 inch; in sealing somewhat larger diameter shafts, however, it has been found that the use of reduced height ribs, for example, ribs of a height of from about 0.001 to 0.003 inch, has been effective. In such cases, a much lower number of wave cycles is normally preferred, such as only two or three cycles, for example, rather than the seven or eight cycles indicated by the formula set forth above.

From the above, it will be noted that the exact number of cycles or waves is not a critical feature of the invention, but that the examples illustrate typical forms of the invention which have been found to be useful. It has been found that seals with ribs of a height of 0.001 inch and with only two complete cycles in a rather large diameter seal have been effective, and that as many as eight or more cycles of a 0.003-inch height rib on a shaft of 2 or 3 inches diameter has also proved effective. In the illustrated embodiments, the wave was a sinusoidal wave; however, other waveforms may prove effective, such as a succession of half sine waves, or a succession of other waveforms such as cycloids of the like. In such a case, the baseline would be remote from the contact area 66 with the maximum ordinate point of the wave approaching or intersecting line 42 or area 66.

It has been found that seals made according to the present invention do not require the high-radial loading previously thought to be required effective pumping seals, and in particular, seals made according to the invention, even when made by the trimmed lip method, have overcome the problem of excess radial loading required with previous trimmed lip-pumping-type seals. However, in general, with trimmed lip seals made according to the invention, rib height and number of cycles are preferably somewhat decreased.

The present invention has been illustrated by reference to examples wherein the cross section of the ribs has been partially circular, as illustrated in FIG. 2, for example. However, the invention is also effective with ribs which are of a sawtoothed configuration, trapezoidal configuration, or other known configuration, it being understood that the exact configuration of any of the ribs does not form a critical part of the present invention.

It will thus be seen that the present invention provides a novel and useful oil seal with pumping action, having a number of advantages and characteristics, including those pointed out herein and others which are inherent in the invention.

We claim:

1. An oil seal unit for creating a seal between a pair of relatively movable elements, said unit having a mounting portion thereof adapted to be fixedly associated in use with a first of said elements, and a generally annular, flexible primary lip portion defined at least partially by converging frustoconical surfaces, said lip having portions thereof facing the second of said elements and being adapted to engage a part of an oppositely directed surface of said second element in generally fluidtight relation to form a seal band area formed by the convergence of said frustoconical surfaces, said primary lip further including portions defining at least one rib having portions thereof adapted to contact said second element to form at least one rib contact area, said rib being in the form of a sinusoidal wave which successively approaches and departs axially from said seal band area at at least one point along the extent of said seal band, said rib also having portions thereof approaching and departing radially from said seal band, said seal band and said at least one rib contact area defining therebetween at least one fluid trapping area of gradually decreasing cross-sectional area at the end thereof lying in one direction of relative rotation of said second element, said seal band area and said at least one rib contact area also defining therebetween at least one similar fluid trapping area with a gradually decreasing cross-sectional area at the end thereof lying in a direction opposite to said one direction.

2. A seal unit as defined in claim 1 wherein said gradually decreasing cross-sectional area is an area which decreases at a reduced rate as said rib approaches said seal band.

3. A seal unit as defined in claim 1 wherein said at least one rib comprises a plurality of ribs, said ribs being axially spaced apart from one another at least in the area where the portion of each of said ribs most closely approaches said seal band.

4. A seal unit as defined in claim 1 wherein said at least one rib is a plurality of ribs, and wherein a portion of the rib lying closest to said seal band has a portion approaching said seal band for contact therewith at a steeper angle than does another of said plurality of ribs which is spaced farther from said seal band.

5. An oil seal unit as defined in claim 1 in which at least one of said ribs, at least once in its extent around said primary lip, approaches, becomes tangent to, and then departs from said seal band.

6. An oil seal unit as defined in claim 1 in which at least one of said ribs, in relation to the annular extent of said seal element, approaches said seal band, intersects the path of said seal band and, at a point spaced circumferentially from said point of intersection, again intersects the path of said seal band and thereafter departs therefrom.

7. An oil seal unit as defined in claim 1 in which a plurality of said ribs are provided.

8. An oil seal unit as defined in claim 1 in which at least one of said ribs is of reduced cross section in those area where it lies closer to said seal band and is of increased cross section where it lies relatively more remote from said seal band.

9. An oil seal unit as defined in claim 1 in which a plurality of said ribs are provided in axially spaced apart relation from one another, with those ribs lying closer to said seal band being of reduced cross section relative to those ribs lying farther apart from said seal band.

10. An oil seal unit including a flexible primary lip portion defined by converging frustoconical surfaces meeting to form an annularly extending seal band area, one of said surfaces facing a region to be sealed and the other surface lying outside said sealed region and a plurality of ribs disposed on said other surface each of said ribs being of substantially constant radial size throughout its extent, said ribs having at least portions thereof axially spaced apart, with portions of said ribs gradually approaching and departing axially from said seal band area, with at least one of the ribs lying closer to said seal band being of reduced radial size relative to those ribs lying axially farther from said seal band area.

11. An oil seal unit as defined in claim 10 wherein said plurality of ribs are of generally sinusoidal form.

* * * * *